United States Patent
Cane' et al.

[11] Patent Number: 6,114,636
[45] Date of Patent: Sep. 5, 2000

[54] APPARATUS FOR WEIGHING SMALL ARTICLES SUCH AS GELATIN CAPSULES

[75] Inventors: Aristide Cane', San Lazzaro Di Savena; Sergio Amaroli, Imola; Salvatore Fabrizio Consoli, Bologna, all of Italy

[73] Assignee: I.M.A. Industria Macchine Automatiche S.p.A., Bologna, Italy

[21] Appl. No.: 09/051,550

[22] PCT Filed: Feb. 17, 1997

[86] PCT No.: PCT/EP97/00739

§ 371 Date: Apr. 9, 1998

§ 102(e) Date: Apr. 9, 1998

[87] PCT Pub. No.: WO97/31244

PCT Pub. Date: Aug. 28, 1997

[30] Foreign Application Priority Data

Feb. 21, 1996 [IT] Italy ................... BO96A0077

[51] Int. Cl.[7] .......................... G01G 19/00; G01G 17/00; B07C 5/16
[52] U.S. Cl. .......................... 177/145; 209/592; 209/645; 177/105; 177/108
[58] Field of Search .................. 177/55, 125, 145, 177/50, 184, 185, 105, 108; 209/645, 649, 592

[56] References Cited

U.S. PATENT DOCUMENTS

| | | | |
|---|---|---|---|
| 3,775,941 | 12/1973 | Bross | 53/246 |
| 4,172,380 | 10/1979 | Ansaloni | 73/864.33 |
| 4,593,778 | 6/1986 | Konishi et al. | 177/185 |
| 4,926,359 | 5/1990 | Konishi et al. | 177/185 |
| 5,852,259 | 12/1998 | Yanase | 177/145 |

FOREIGN PATENT DOCUMENTS

| | | |
|---|---|---|
| 0 615 739 A1 | 9/1994 | European Pat. Off. . |
| 0 685 714 A1 | 12/1994 | European Pat. Off. . |
| 44 37 423 A1 | 4/1995 | Germany . |
| 07305829 | 11/1995 | Japan . |
| 2 269 354 | 2/1994 | United Kingdom . |

*Primary Examiner*—Randy W. Gibson
*Attorney, Agent, or Firm*—Fattibene & Fattibene; Arthur T. Fattibene; Paul A. Fattibene

[57] ABSTRACT

The capsules or other products (1) are fed by a vertically arranged tube-shaped conveyor (4, 5, 10, 11, 12, 112, 13) in single file and taken up one at a time by a tangential wheel (16) which is fitted with reference teeth (18), with each tooth supporting one product, and has suction holes (19) to retain the products. When the products are about to reach a position above suitably shaped associated weighing heads (24), the suction that holds them against the wheel is cut off and the products fall, positioning themselves correctly on the heads, aided in part by the halting action exerted by the teeth in front. The products deposited on the heads are weighed and are then discharged by the pushing action of the wheel teeth (18) which place the next product on the heads. A chute (25) collects the products ejected from the heads and a deflection plate (26), controlled by the central processing and control system (32), separates products of the correct weight from those to be rejected. Several apparatus of this type are placed next to each other so as to obtain high production rates.

3 Claims, 2 Drawing Sheets ns to overcome these drawbacks with a
APPARATUS FOR WEIGHING SMALL ARTICLES SUCH AS GELATIN CAPSULES The invention relates to an apparatus for automatically weighing small products in a continuous cycle, in particular filled gelatin capsules or tablets. In the following description reference will, for the sake of convenience, be made solely to gelatin capsules. It should be understood, however, that the apparatus according to the invention shall also be protected with respect to checking the weight of tablets or of any other product that involves similar requirements. The apparatus in question may, for example, be applied industrially to select capsules from those batches which have been rejected on account of defects detected by statistical weight checking systems associated with the machine that fills and closes the said capsules. Apparatus of known type essentially operate with an intermittent and reciprocating motion that is relatively slow and inaccurate on account of the considerable vibrations generated by the reciprocating components.

The invention aims to overcome these drawbacks with a continuously operating device whereby the capsules are fed in single file and taken up one at a time by a wheel which is fitted with reference teeth, with each tooth supporting one capsule, and has suction holes so as to retain the said capsules. When the capsules reach or are about to reach a position above suitably shaped associated weighing heads, the suction that holds them against the wheel is turned off and the said capsules fall, positioning themselves correctly on the said heads, aided in part by the halting action exerted by the teeth in front. The capsules deposited on the heads are weighed and are then discharged by the pushing action of the wheel teeth which place the next capsule on the said heads. A chute collects the capsules ejected from the weighing heads and a deflection plate, controlled by the central processing and control system, separates capsules of the correct weight from those to be rejected. Several apparatus of this type are placed next to each other so as to obtain high production rates.

Additional characteristics of the invention and the advantages derived therefrom will become apparent from the following description of a preferred embodiment of the invention, illustrated purely by way of non-limiting example in the figures of the two appended plates of drawings, in which.

Figure 1:
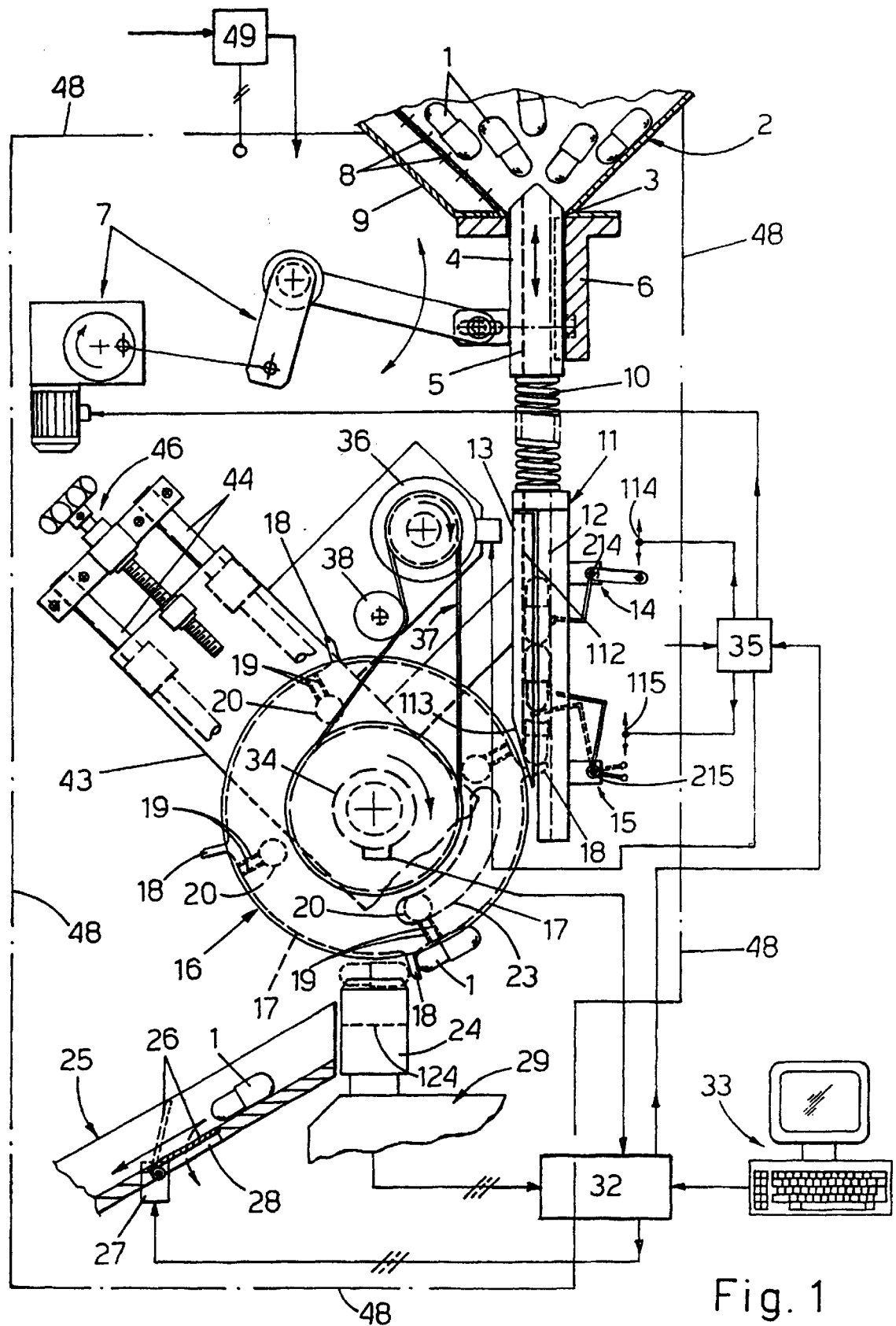
FIG. 1 is a diagrammatic side view, with some parts in section, of the apparatus.

From the figures it may be seen that the capsules 1 to be weighed are fed in bulk into a hopper 2 that projects from a supporting structure 100 (FIG. 2) and has a straight horizontal aperture 3 at the bottom through which passes a parallelepipedal plunger 4, of known type, with a double-bevelled top and a plurality of evenly spaced vertical holes 5 having a diameter such that the capsules can travel through them when the latter are arranged in single file and their longitudinal axis is aligned with the longitudinal direction of the holes. The plunger 4 is associated with vertical guide 6 fixed to the structure 100, and is connected known drive actuator 7 which impart a straight reciprocating motion that is relatively slow and of an amplitude such as to facilitate insertion of the capsules into the holes 5. So as to ensure that the capsules are clean when they reach the holes 5 in which they are lined up one behind the other, at least part of the sloping wall of the hopper on to which the capsules are fed is perforated in the manner indicated by the reference numeral 8, so that dust and small impurities, such as for example pieces of broken or open capsules, can be discharged and collected in a vessel 9 that can be removed for periodical cleaning or connected to a suction means, which is not shown.

The lower ends of the holes 5 abut coaxially against associated cylindrical helical springs 10 which are made of steel or other suitable material, have an internal diameter essentially equal to that of the said holes 5 and are fixed, via their upper ends, to the plunger 4 and, via their lower ends, to a corresponding parallelepipedal body 11 which is fixed to the said structure 100 and has a plurality of vertical half-channels 12, each of which is aligned with a spring 10 and, in cross-section, has the shape of a sector of a circle. As the capsules leave the springs 10, they are partly guided by a parallelepipedal body 13 located in front of the above-mentioned body 11 and having vertical half-channels 112 in the shape of a sector of a circle. These half-channels 112, together with the half-channels 12, form vertical channels through which the capsules to be weighed slide longitudinally, without excessive clearance. The following description will show how it is possible, by adjusting the distance between the body 13 and the fixed body 11, to adjust the internal diameter of the guide channels 12, 112 in order to adapt them to the size of the capsules.

Located on an intermediate section of the fixed body 11 are vertical slots (not shown) which run down the middle of the half-channels 12 and in which operate the tips of associated horizontal combs 14, 15 articulated to the said body 11 at 214, 215 and connected by means of levers to associated actuators that impart a straight reciprocating motion, for example actuators of electromagnetic type or of a type driven by fluid pressure, indicated diagrammatically by the arrows 114, 115 and anchored to the structure 100. The combs 14, 15 are positioned one above the other with a distance between them such that they form a release device of known type which, at the appropriate moment, allows only the bottom capsule in each column to pass into each channel 12, 112, while holding back the capsules above it. When the comb 15 is in the position shown by the dashed lines, the comb 14 is retracted so that the entire column of capsules present in each channel 12, 112 is supported on the teeth of the lower comb 15. Before a capsule is to be fed, the comb 14 is activated and its tips project into the channels 12 so as to exert sufficient pressure on the second capsule in each column so that, when the comb 15 is retracted, as indicated in FIG. 1 by solid lines, only the bottom capsule falls, all the other capsules being held back by the teeth of the comb 14.

The bottom of the body 13 terminates in a tapered part 113 that extends an appropriate distance beneath the comb 15 and has longitudinal slits (not shown) which run along the middle of the half-channels 112. To the side of the body 13 and tangentially to the terminal part thereof, is a cylindrical wheel 16 having a round cross-section and a horizontal axis, which wheel projects from and is rotatably supported by the structure 100 in the manner described below. The wheel 16 rotates at an appropriate speed and continuously in a clockwise direction when viewing FIG. 1. The wheel 16 has curved annular recesses 17 with a radius essentially equal to or slightly greater than that of the largest capsules the apparatus can handle. One such recess is provided for each half-channel 112, positioned in tangential alignment with the said half-channels 112 so that the capsule which is cyclically allowed to fall by the comb 15 is guided between a portion of the recess 17 and the corresponding terminal part of the half-channel 12 in the facing body 11. Fixed in each recess 17 of the wheel 16 are essentially radial, preferably flat, teeth 18 with sufficiently rounded free ends, which teeth are spaced an equal angular distance apart, for example four teeth set 90° apart. The length of the teeth 18 is such that they project as far as possible into each channel 12, 112 without actually touching the body 11. A short distance behind each tooth 18, in the bottom of each recess 17, is a pair of small holes 19, positioned one behind the other and connecting up with longitudinal ducts 20 formed in the wheel 16. These ducts 20 are sealed at the projecting end of the said wheel but are open at the end of the wheel that is coupled to a rotary distributor 21 which is itself supported by the structure 100, is connected to a fixed suction duct 22 and has a fixed opening in the shape of a sector of a circle 23, concentric with the axis of rotation of the said wheel, with which opening the ends of the ducts 20 communicate. The angular position of the opening 23 and its length are such that the pairs of holes 19 are connected to the suction source when the teeth 18 project into the channels 12, 112 and are approximately in a horizontal position, and such that the said suction is maintained until the said teeth reach an essentially vertical position, in which they point downwards (see below).

Suitable means, which will be described below, are provided in order to synchronize the operation of the release device 14, 15 with the rotation of the wheel 16 so that, when a row of teeth 18 has been inserted into the channels 12, 112, the comb 15 is retracted and allows one capsule to drop into each channel, the said capsule being stopped by the said teeth 18. Before the teeth 18, together with the capsules above them, leave the channels 12, 112, suction is set up in the pair of holes 19 behind the said teeth and each capsule is held firmly inside the corresponding annular recess 17 of the wheel which then transfers the row of capsules on to the weighing means.

Figure 2:
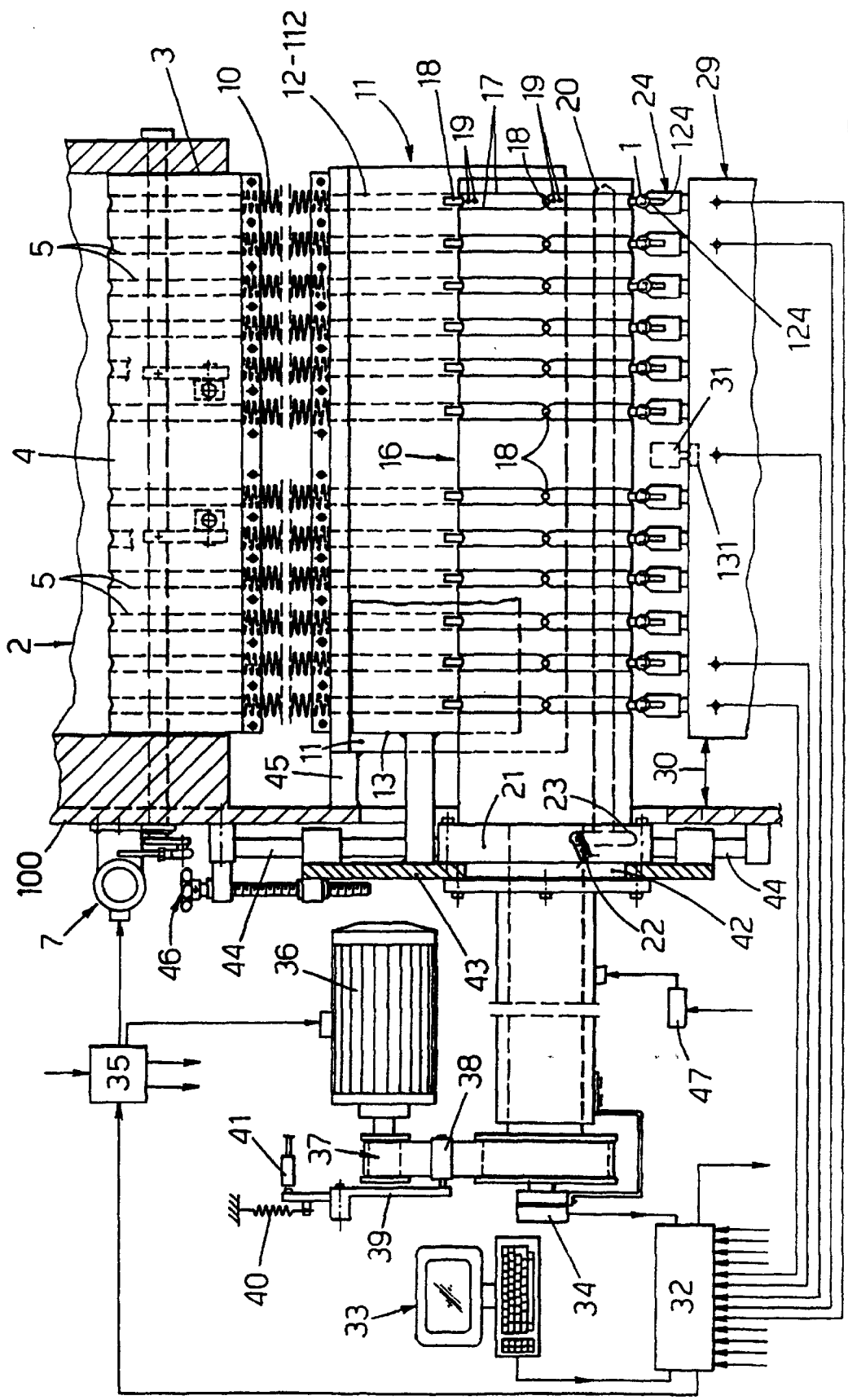
FIG. 2 is a diagrammatic front view, with some parts in section, of the same apparatus.

When the wheel 16 teeth 18 reach the lower vertical position, the suction inside the holes 19 is cut off at the appropriate moment, as a function of the speed of rotation of the said wheel. The capsules 1 drop from the corresponding recesses 17 in the wheel and, halted by the relevant tooth 18 in front, are deposited in the grooved neck 124 of appropriate heads 24 which are associated with a corresponding electronic precision-weighing system of known type. Before the teeth 18 leave the capsules on the heads 24, the said capsules have already dissipated their kinetic energy and are securely positioned on the said heads. FIG. 2 shows that the cavities 124 are essentially "Y"-shaped, with the upper part wide enough to accommodate and centre the capsules of various size, while the teeth 18 travel through the lower part.

Before the next capsule is positioned on a head 24, there is sufficient time to ensure that the capsule which has been deposited on the same head during the preceding cycle can be weighed and then discharged therefrom by the pushing action of the tooth 18 bringing the next capsule.

During the time it takes to place a capsule on a head 24 and for each tooth 18 to return in engagement with the channels 12, 112, the holes 19 are isolated from the source of suction. It is possible, during a fraction of this period of time, for the said holes 19 to undergo a cleaning phase, for example through the combined action of compressed air, which is blown through them via the rotary distributor 21, and/or by means of the suction exerted by an external mouth adjacent to the wheel 16, such a set-up being conceivable to and easily implemented by experts in the field, even if it is not illustrated in the drawings.

The capsules that are ejected from the weighing heads 24 fall into the various channels of a fixed chute 25. On the bottom of each channel there is a plate 26 which is controlled by an actuator 27 and usually closes a trap-door 28 beneath which are located means for collecting the capsules, with other collection means being provided in the terminal part of each channel in the chute. If the capsule weight measured by the head 24 falls within the pre-established tolerances, the plate 26 remains at rest, as indicated by the solid lines, and the capsule is collected at the exit to the chute 25. If, on the other hand, the capsule is not of the correct weight, the plate 26 opens the trap-door 28 and the reject capsule falls through it.

It may be seen from FIGS. 1 and 2 that the weighing unit 29 with the abovementioned heads 24 is fitted with a known alignment structure, indicated diagrammatically by the arrows 30, which enable it to be oriented and fixed in the correct position with respect to the structure 100, and therefore to the wheel 16, but in such a way that dangerous vibrations which could falsify results are not transmitted to the said unit. To this end, the weighing unit 29 is supported by a suitable damped structure (not illustrated) which is essentially independent of the structure 100, and carries, in a central position, an optional mass 31 in place of a head 24, the transducer 131 of which measures the variations in the weight reading and to what extent these are caused by the vibrations. The transducer 131 is connected to the main electronic processor 32 which connects up with the transducers of the various weighing heads 24 and which, by means of a suitable algorithm, processes the signal supplied by the individual heads and subtracts from it the spurious signal resulting from the vibrations, delivering a signal that corresponds to the actual weight of the individual capsule being checked. The actuators 27 that sort the weighed capsules are activated by the processor 32 into which control and reference parameters are fed, as and when necessary, via the keyboard/screen unit 33.

Mounted via a positive drive or directly on the shaft of rotation of the wheel 16 is a tachometric encoder/dynamo unit 34, or unit of other suitable type, that transmits the signals corresponding to the speed and angular position of a reference point on the wheel to the processor 32. The processor 32 uses these signals to activate, via suitable interfaces 35, the actuator 7 that raise and lower the plunger 4 and in particular to activate the release combs 14, 15 at the appropriate moment. The interfaces 35 are also responsible for activating the electric motor 36 with brake which, via the belt and sprocket drive 37, activates the shaft of the wheel 16. Mounted on the drive side of the drive 37 is a tensioning device 38 supported by an oscillating lever 39 which is spring-loaded 40. If the wheel 16 is prevented from rotating by an obstacle of some sort, for example by a deformed capsule on a weighing head 24 or in a channel 12, 112, the drive side of the drive 37 shortens and the lever of the tensioning device oscillates, changing its position with respect to a sensor 41 which then causes the apparatus in question to stop automatically.

The support plate 100 has an opening 42 through which the wheel 16 passes, the latter being mounted, together with the rotary distributor 21, on a slide 43 that runs along parallel guides 44 fixed to the rear side of the said plate and inclined at approximately 45°, or at some other suitable acute angle, with respect to the ideal plane on which the vertical capsule-guiding means 4, 10, 11, 13 lie. The body 13 with the half-channels 112 is fixed on the said slide 43 by means of the support indicated diagrammatically by the reference 45. The slide 43 is firmly attached to the guides by means of a screw-and-nut adjustment device 46, by acting on which it is possible to adjust the distance the wheel 16 and the body 13 are set away from the fixed body 11 and, at the same time, to adjust the distance between the said wheel 16 and the weighing heads 24, so as to adapt these distances to the size of the capsules which are to be checked at any given time. The plunger 4 and the springs 10 are replaced as the size of the capsules changes.

The apparatus in question is completed by a device, for example a deionizing bar indicated diagrammatically by the reference 47, for eliminating static electricity from the wheel 16 which is in turn made from or covered with a material designed to facilitate the elimination of this drawback. The apparatus is also preferably located in a casing 48 that isolates it from the external environment and in which, via a suitable control system 49 of known type, the temperature and relative humidity parameters relating to the internal environment are kept as constant as possible, so as to ensure that the weight of the capsules is checked accurately and independently of the characteristics of the external environment.

What is claimed is:

1. Apparatus for weighing small articles (1) including gelatin capsules loaded in bulk in a feeding hopper (2) characterized by the fact that it comprises:

means (4, 5, 10, 11, 12. 112, 13) for taking up the articles (1) one at a time from the hopper (2) and aligning them in a single file in at least one column along which they descend by gravity;

means (14, 15) to control the descent of articles (1) along the column and allow singularly the bottom article to fall from the column;

rotary conveyer means (16) provided with stop means (18) for stopping the bottom article (1) falling free from the column and with suction means (19) which are active along an arc of circumference for retaining the bottom article until it reaches a substantially horizontal position, at which the suction is cut off;

weighing means (24, 29) located underneath the said conveyor means to receive the article (1) dropped by said conveyor means as a consequence of the suction cut off;

means (32, 33) for checking the weight of the article with respect to predetermined limits and means (25, 26, 27, 28) for discharging the weighed articles by sorting the articles having a correct weight from those to be rejected, characterized that the means for aligning the capsules taken up from the loading hopper (2) on to several columns, comprise a plunger (4) inserted in an aperture (3) in the bottom of the said hopper, which plunger is attached to vertical guide means (6) and connected to raising and lowering means (7), the said plunger having a plurality of evenly spaced vertical holes (5) into which the capsules are inserted and aligned, with the lower ends of these holes abutting coaxially against associated cylindrical helical springs 91) whose lower end is connected to a fixed vertical body (11, 13) having vertical channels (12, 112) which receive the capsules from the said springs and guide them downwards with a minimum amount of clearance, the said guide body being beveled (113) on the side facing the conveyor wheel (16) and having terminal longitudinal slits in order to allow the teeth (18) on the said conveyor wheel to pass, while the other side of the said guide body has longitudinal slots through which pass the tips of two parallel combs (14, 15), positioned one an appropriate distance above the other and connected to associated actuators (114, 115), the said combs being synchronized with the rotation of the said wheel (16) and, when the lower comb is activated, they stop the columns of capsules above the orbit of rotation of the wheel teeth (18), then, when the upper comb is activated and the lower comb subsequently deactivated, they retain the second capsule and allow the bottom capsule to fall once the said wheel teeth are positioned below it, after which, once the capsule has been carried away, the lower comb is reactivated and the upper comb retracted so that the cycle can be repeated.

2. Apparatus according to claim 1, in which the final body to guide the columns of capsules is formed by two adjacent bodies (11, 13) containing associated vertical half-channels (12, 112) which together form the capsule guiding channels, the body (11) opposite the conveyor wheel (16) being fixed while the opposing body (13) is adjustable in terms of its distance from the body (11) and is associated with suitable adjustment means so as to adapt the width of the channels (12, 112) to the size of the capsules to be weighed, with the springs (10)/plunger assembly being replaced, if necessary, as the capsule size varies.

3. Apparatus according to claim 1, in which the conveyor wheel (16) is associated with means for adjusting its distance from the subjacent weighing heads (24), as the size of the capsules to be weighed varies.

* * * * *